(12) United States Patent
Wheeler (10) Patent No.: US 7,372,627 B1
(45) Date of Patent: May 13, 2008

(54) HOLDER FOR FIELD GLASSES

(76) Inventor: Richard L. Wheeler, 5078 Babb La., Pace, FL (US) 32571

( * ) Notice: Subject to any disclaimer, the term of this patent is extended or adjusted under 35 U.S.C. 154(b) by 0 days.

(21) Appl. No.: 11/644,026

(22) Filed: Dec. 22, 2006

(51) Int. Cl.
*G02B 23/00* (2006.01)
(52) U.S. Cl. .................. 359/408; 359/407; 359/896
(58) Field of Classification Search ........ 359/399–409, 359/480–482, 808–830, 896; D16/133
See application file for complete search history.

(56) References Cited

U.S. PATENT DOCUMENTS

| | | | |
|---|---|---|---|
| 4,325,602 A | * | 4/1982 | Lange .................. 359/408 |
| 4,606,618 A | * | 8/1986 | Geller .................. 359/408 |
| D425,922 S | * | 5/2000 | Huckenbeck .............. D16/133 |

* cited by examiner

*Primary Examiner*—Thong Q Nguyen
(74) *Attorney, Agent, or Firm*—Peter Loffler (57) ABSTRACT

A holder for field glasses has a pair of substantially similar resilient receptacles that each has a main body with an open bottom and a narrower neck with an open top. A slot is located in each neck portion while a slit extends between each slot and its respective open bottom. The two receptacles are attached to each other so as to be parallel to one another and so that each slit generally faces the other receptacle. A pair of binoculars is inserted, ocular lens side first, through the bottoms of each main body by gapping each receptacle with the bridge of the binoculars passing through the gapped slits. Once the bridge is received within the slots of the two receptacles, the slits are degapped. Alternately, the binoculars themselves may have the form of a pair of drink receptacles.

14 Claims, 7 Drawing Sheets

HOLDER FOR FIELD GLASSES

BACKGROUND OF THE INVENTION

1. Field of the Invention

The present invention relates to a novelty holder for field glasses (binoculars) wherein the holder has the look of a pair of joined beverage receptacles.

2. Background of the Prior Art

Spectator sports are catering to ever increasingly larger crowds as the size of the stadiums grows with the television audience likewise growing. As a result, more and more spectators are located in the farther reaches of the stadium so that seeing the action with reasonable clarity becomes challenging. Even in a small venue, a person in a good seat behind the home team, may have a tough time seeing the action that is taking place on the visiting team's side. In auto racing, due to the necessary size of the racing field, almost all of the action tends to be far away for all, both those in premium seats and those in general seats. As a result, bringing binoculars to a sporting venue is becoming increasing popular with the relatively small field glasses being a popular pick for the type of binoculars brought. The popularity of field glasses is due to their relatively compact size of and their having good optics in a well lit area such as at a sporting event. The binoculars let fans see the action up close irrespective of where a particular fan's seat may be located and where within the venue the particular action to be observed is occurring. The binoculars bring the action closer than can be achieved with the naked eye and also allow a fan to people watch, one of the benefits of going to a sporting event.

Also popular at sporting events is the desire of many fans to show spirit above that achieved with simple clapping and yelling. Increasingly, fans are turning to various novelty items as part of their regular sporting day paraphernalia as a spirit enhancing tool. Such novelty items include such simple items as hats or shirts that have a team's colors or a particular athlete's name thereon, to more exotic "clothing" such as face paint or body paint, to non-wearable items such as flags, towels, and novelty lights. These various novelty items help many fans get into and stay in the spirit of the event being attended.

Accordingly, it would be advantageous to take the functional properties of a pair of binoculars and enhance them with a novelty motif that can help fans get into the sporting event spirit. Advantageously, such a device should be of simple design and construction yet have a high recognition factor by others. Such a device should be relatively low cost so that it is readily affordable to a large fan base. Such a device should not detract or otherwise limit the functional properties of the pair of binoculars.

SUMMARY OF THE INVENTION

The holder for field glasses of the present invention addresses the aforementioned needs in the art by providing a device that holds a pair of binoculars, yet also serves as a novelty item that helps fans get into and stay the spirit of the event being attended. The holder for field glasses is of relatively simple design and construction so that it is readily simple to manufacture, making the device relatively affordable to a large segment of the fan base. The holder for field glasses is recognizable by other fans for what it is, namely a clever novelty item. The holder for field glasses not only does not detract from the functional properties of the field glasses, but acts as a protective device for the field glasses protecting the field glasses from falls, bumps, and other interferences.

The holder for field glasses of the present invention is comprised of a resilient first receptacle (which may be a typical plastic drink bottle) that has a first body portion and a first neck portion extending from the first body portion. The first body portion has an open first bottom and the first neck portion has an open first top. A first slot is located within the first neck portion and a first slit extends between the first bottom and the first slot. A resilient second receptacle (which may also be a typical plastic drink bottle) has a second body portion and a second neck portion extending from the second body portion. The second body portion has an open second bottom and the second neck portion has an open second top. A second slot is located within the second neck portion and a second slit extends between the second bottom and the second slot. The second body portion of the second receptacle is attached to the first body portion of the first receptacle such that the first receptacle and the second receptacle are parallel to each other and such that the second slit faces the first body portion and the first slit faces the second body portion. A first outer surface of the first neck portion has first threading thereon proximate the first open top and a second outer surface of the second neck portion has second threading thereon proximate the second open top. A first cap is removably and threadably attached to the first threading while a second cap is removably and threadably attached to the second threading. The first cap is attached to the first receptacle by a first tether and the second cap is attached to the second receptacle by a second tether. A pair of binoculars has a first body member with a first objective lens and a first ocular lens and a second body member with a second objective lens and a second ocular lens with the first body member and the second body member connected to each other by a bridge. The binoculars are removably receivable with the first receptacle and the second receptacle by gapping the first slit and gapping the second slit and inserting the binoculars into the first receptacle and the second receptacle, first ocular lens side and second ocular lens side first and passing the bridge through the gapped first slit and the gapped second slit until the bridge is received within the first slot and the second slot wherein the first slit resiliently degaps and the second slit resiliently degaps.

Alternately, the binoculars can be an integral party of the two receptacles such that two ocular lenses are located at the two open tops respectively of the neck while the two objective lenses are located at the two open bottoms respectively. The bridge is integrally attached to the two receptacles and there is no need for the slits or the slots. Such binoculars function in the usual way.

BRIEF DESCRIPTION OF THE DRAWINGS

Similar reference numerals refer to similar parts throughout the several views of the drawings.

DESCRIPTION OF THE PREFERRED EMBODIMENT

Referring now to the drawings, it is seen that the holder for field glasses of the present invention, generally denoted by reference numeral 10, is comprised of a pair of holders, namely a first holder 12 and a second holder 14. As seen, the first holder 12 has a first main body portion 16 with a first open bottom 18 and a first neck portion 20 extending upwardly from the first main body portion 16, the first neck portion 20 terminating at a first open top 22. First threading 24 is located on an outer surface of the first neck portion 20 proximate the first open top 22. A first cap 26 is threadably and removably attachable to the first neck portion 20 via the first threading 24. The first cap 26 is attached to the first holder 12 via a first tether 28. A first slit 30 is located along the first holder 12 and starts at the first open bottom 18 and runs straight along the entire length of the first main body portion 16 and terminates at a first slot 32 located on the first neck portion 20. The first holder 12 is made from an appropriate sturdy and resilient material such as plastic. Basically, the first holder 12 is a typical plastic beverage holder, such as a common 12 ounce plastic beer receptacle or soft drink receptacle, with the bottom cut out to form the first open bottom 18, a first slot 32 made into the first neck portion 20, and a first slit 30 formed in this receptacle running from the first slot 32 to the first open bottom 18. The first holder 12 can be made from an existing beverage holder or can be specifically manufactured in the usual way to have the above specifications.

The second holder 14 is substantially similar to the first holder 12 and has a second main body portion 34 with a second open bottom 36 and a second neck portion 38 extending upwardly from the second main body portion 34, the second neck portion 38 terminating at a second open top 40. Second threading 42 is located on an outer surface of the second neck portion 38 proximate the second open top 40. A second cap 44 is threadably and removably attachable to the second neck portion 38 via the second threading 42. The second cap 44 is attached to the second holder 14 via a second tether 46. A second slit 48 is located along the second holder 14 and starts at the second open bottom 36 and runs straight along the entire length of the second main body portion 34 and terminates at a second slot 50 located on the second neck portion 38. The second holder 14 is made from an appropriate sturdy and resilient material such as plastic. Similar to the first holder 12, the second holder 14 is also a modified typical plastic beverage holder, such as a common 12 ounce plastic beer receptacle or soft drink receptacle, with the bottom cut out to form the second open bottom 36, a second slot 50 formed in the second neck portion 38, and a second slit 48 made into this receptacle running from the second slot 50 to the second open bottom 36. The second holder 14 can also be made from an existing beverage holder or can be specifically manufactured in the usual way to have the above specifications.

Figure 1:
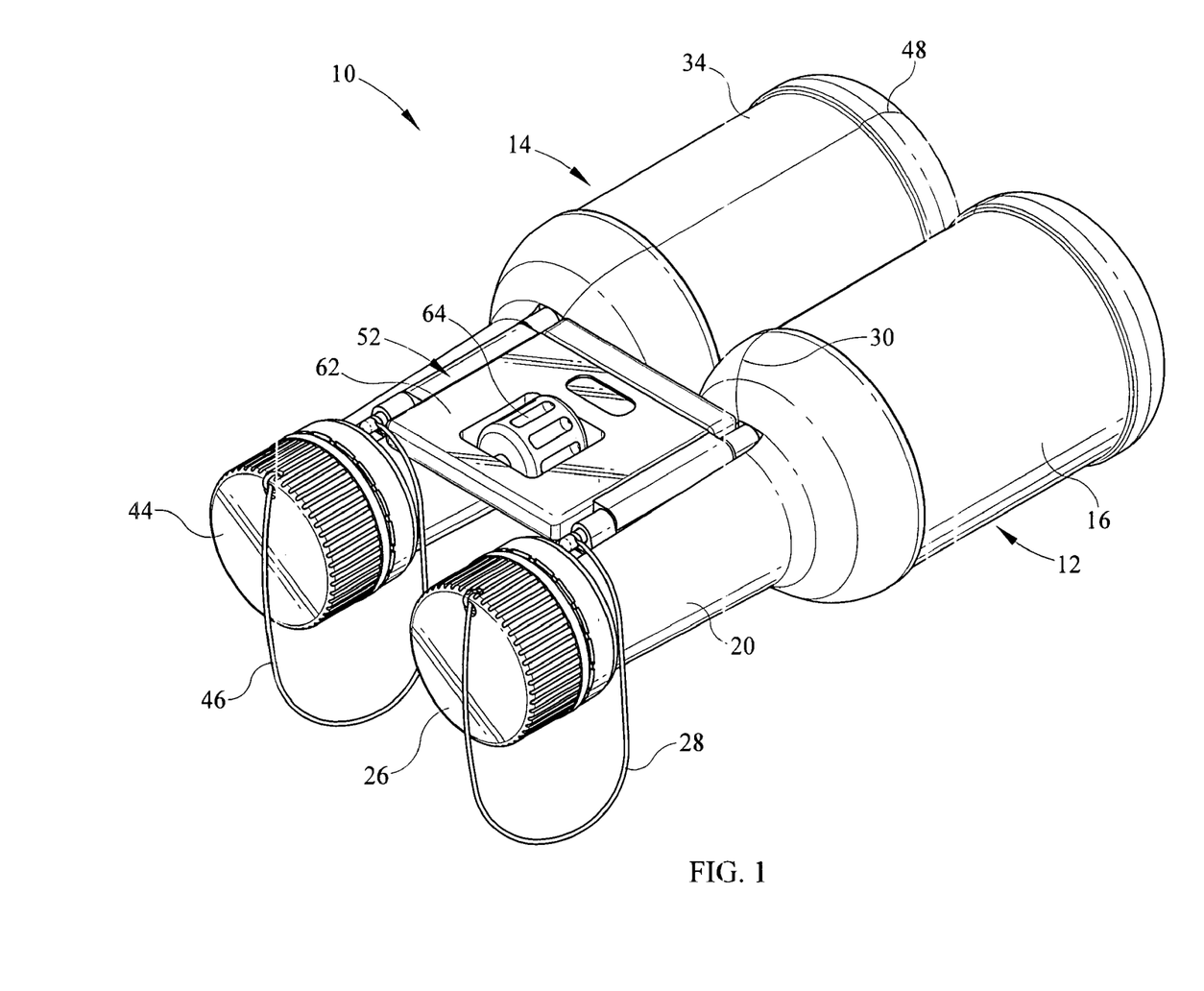
FIG. 1 is a perspective view of the holder for field glasses of the present invention with the protective caps in place.
Figure 2:
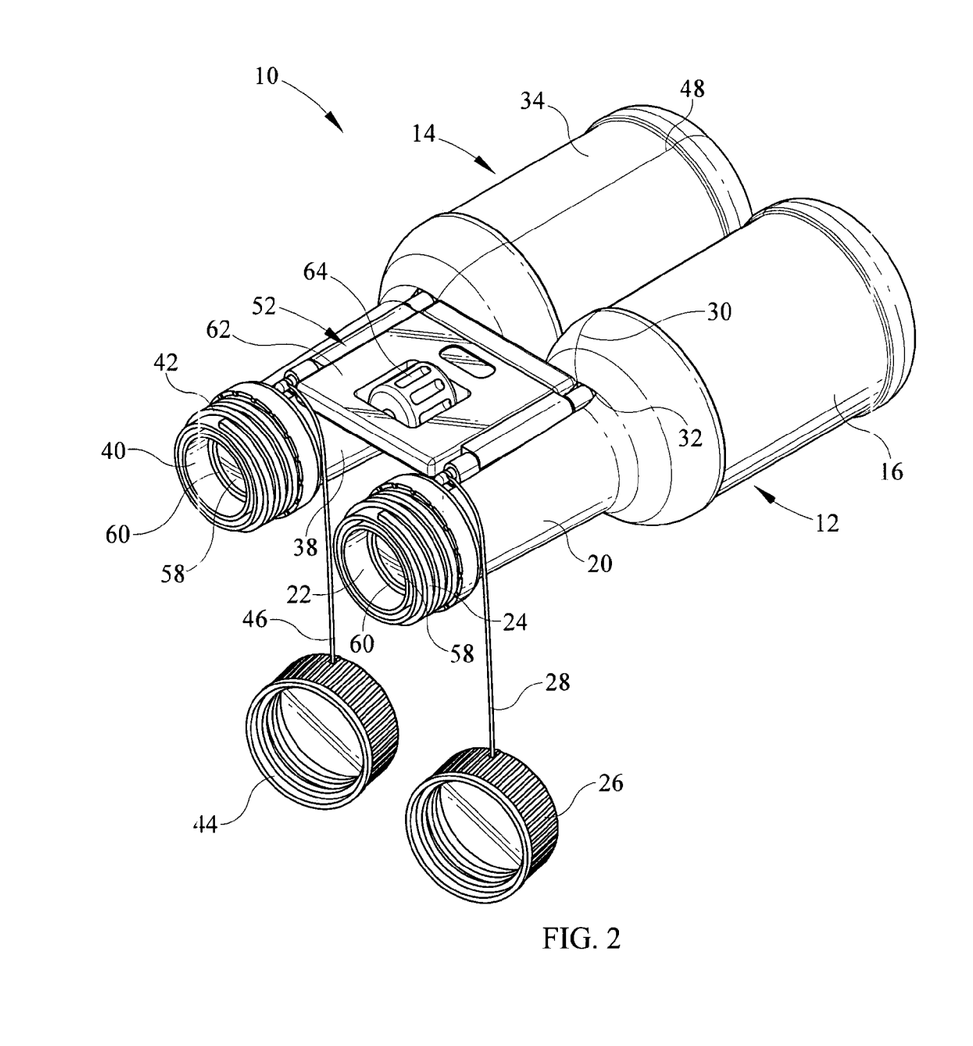
FIG. 2 is a perspective view of the holder for field glasses with the protective caps removed.
Figure 3:
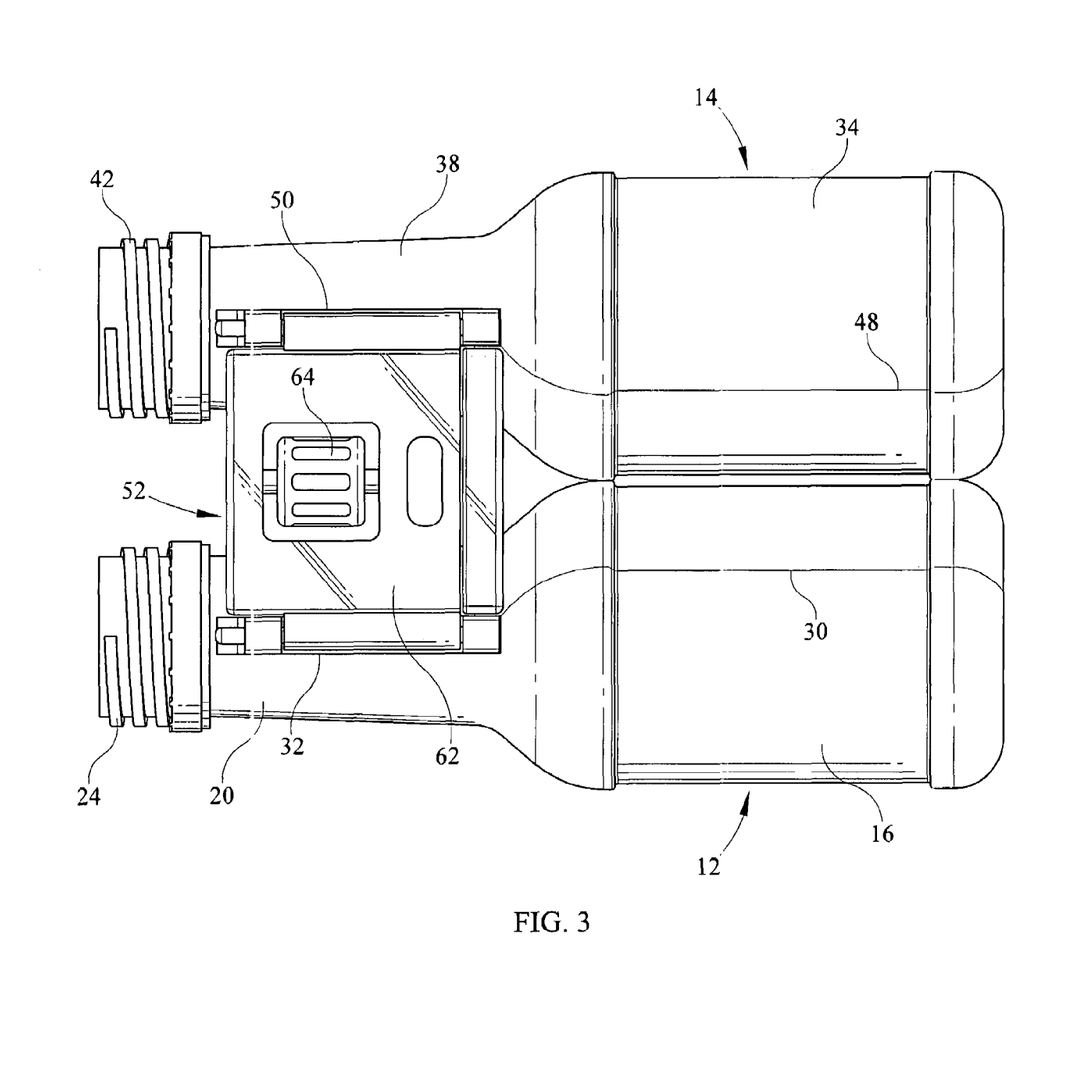
FIG. 3 is a top plan view of the holder for field glasses.
Figure 4:
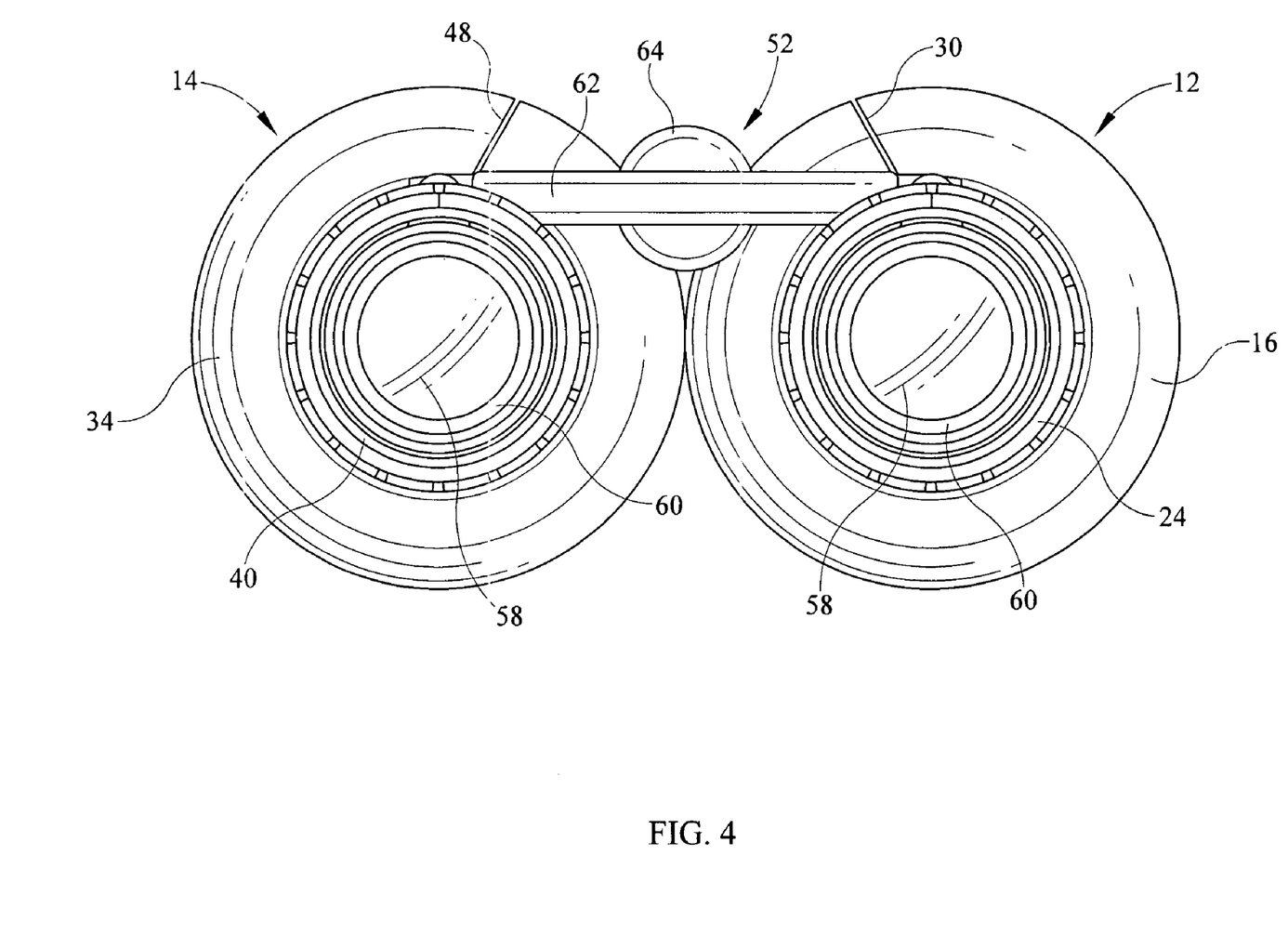
FIG. 4 is a front elevation plan view of the holder for field glasses.
Figure 5:
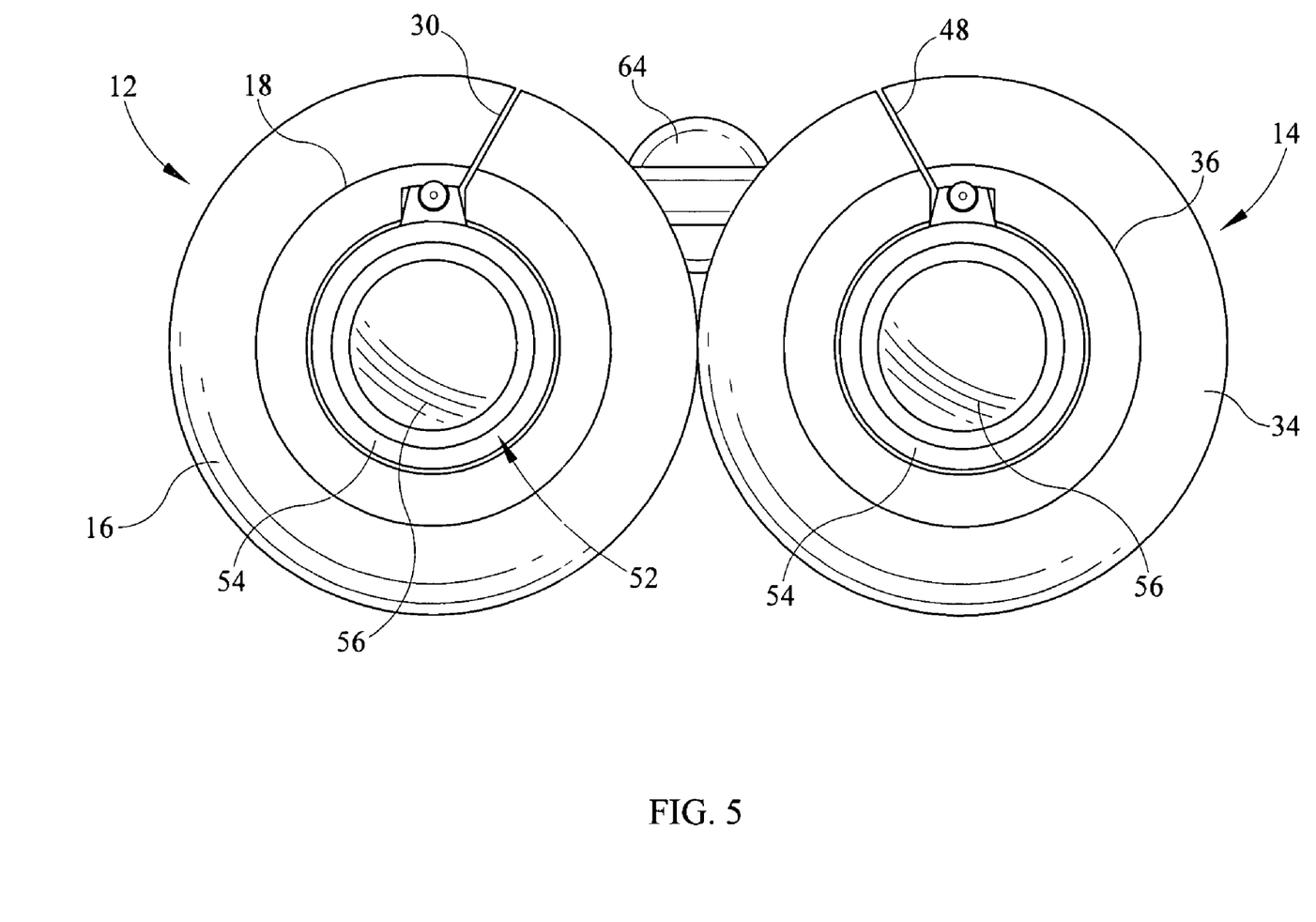
FIG. 5 is a rear elevation view of the holder for field glasses.
Figure 6:
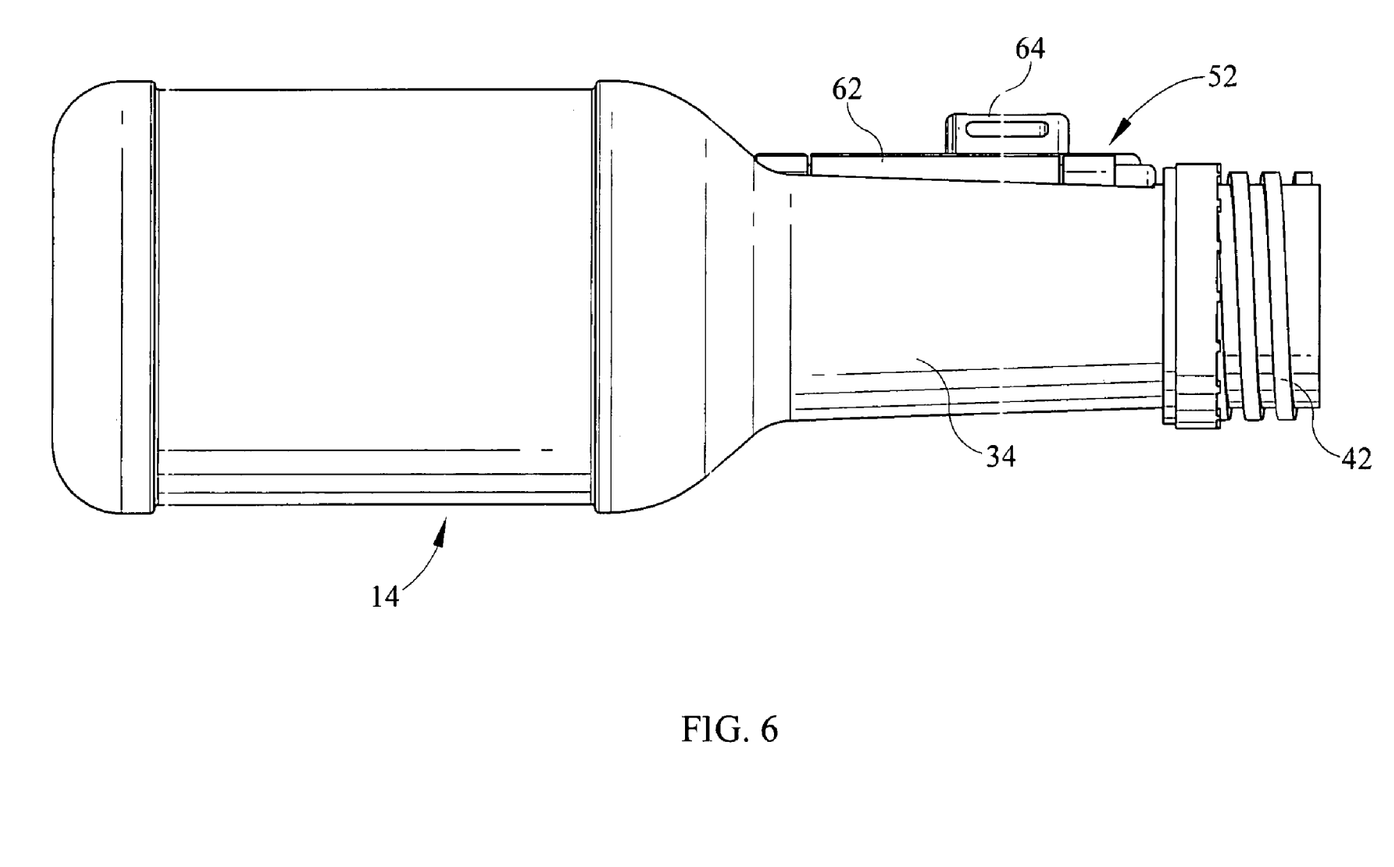
FIG. 6 is a side elevation view of the holder for field glasses.
Figure 7:
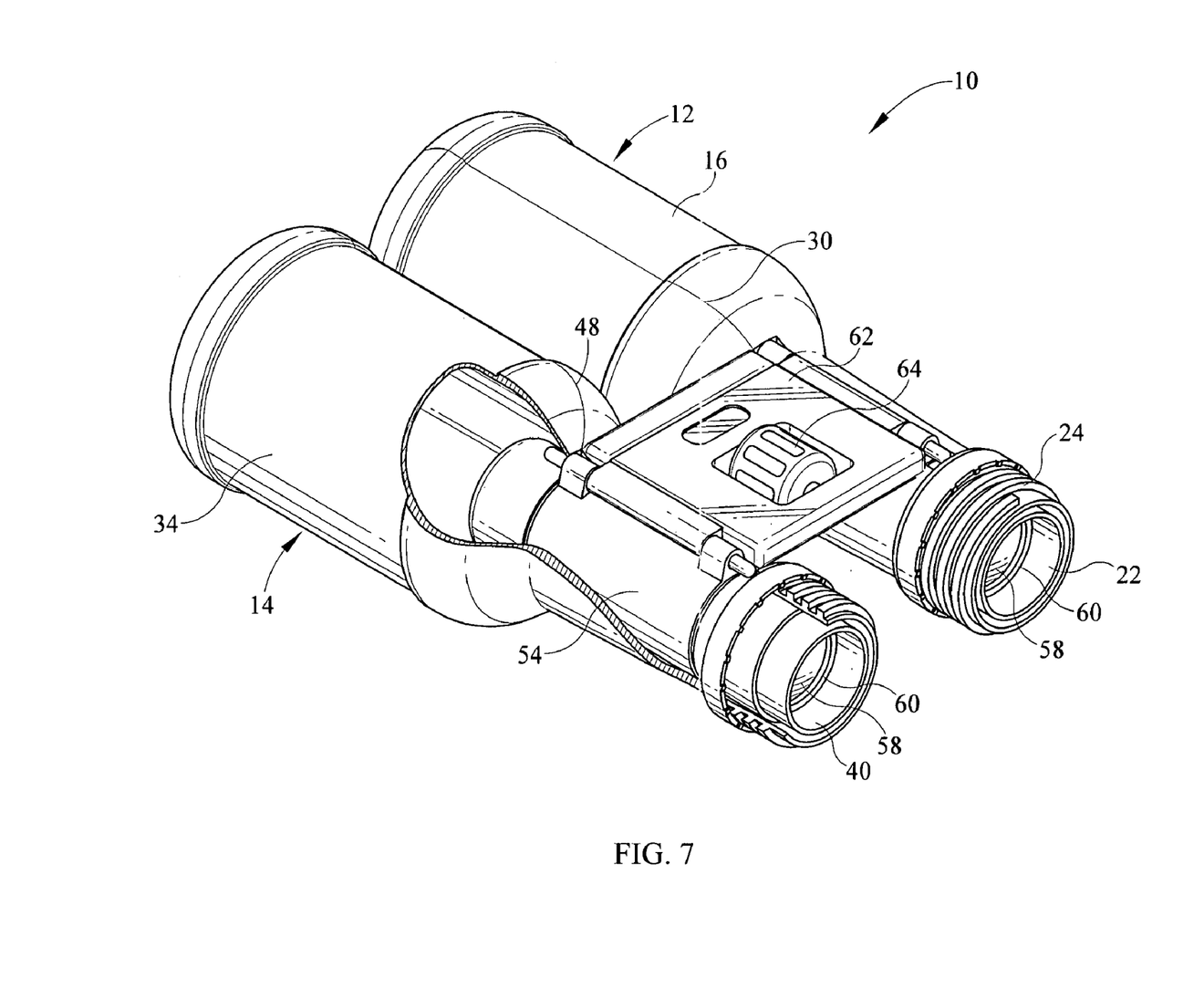
FIG. 7 is a perspective view, partially sectioned, the holder for field glasses.

The first holder and the second holder may each have an appropriate label (not illustrated) thereon, which label may be for the beverage of choice which each receptacle 12 and 14 represent, or may have an image of a desired team or athlete or any other desired image thereon, The first holder 12 and the second holder 14 are attached to each other at their respective main body portions 16 and 34 so that the two holders 12 and 14 are parallel to each other. Attachment of the first holder 12 with the second holder 14 can be accomplished in any appropriate fashion (or they can be manufactured already joined) such as by adhesion, by ultrasonically welding the two holders 12 and 14 to one another, etc. When the two holders are attached, and with specific reference to FIG. 5, the first slit 30 of the first holder 12 is located at approximately the two o'clock position (facing upwardly and generally toward the second holder 14) whereas the second slit 48 of the second holder 14 is located at approximately the ten o'clock position (facing upwardly and generally toward the first holder 12).

A typical pair of binoculars 52, specifically a pair of field glasses, has a pair of body members 54 each having an objective lens 56 and an ocular lens 58 located at an eye piece 60, the two body members 54 being joined by a bridge 62 that has a typical focus wheel 64 thereon. The binoculars 52 are positioned within the holder for field glasses 10 by gapping open each holder 12 and 14 at their respective slits 30 and 48. The binoculars 52 are then inserted into the holder 10, ocular lens 58 side first, through the now gapped slits 30 and 48. Insertion of the binoculars 52 continues until the bridge 62 of the binoculars 52 is received within the two slots 32 and 50 of the first holder 12 and the second holder 14 respectively. The first holder 12 and the second holder 14 are now permitted to resiliently return to their relaxed positions. The two slots 32 and 50 are sufficiently wide so that the bridge 62 does not cause any gapping of the two holders 12 and 14 and the slits 30 and 48 are only minimally perceptible. The exact positioning of the two slits 30 and 48 is dependant on the specific geometry of the binoculars 52 in order to allow the binoculars 52 to pass through the first holder 12 and second holder 14 without undue obstruction or the need for excessive gapping (which could cause the holders 12 and 14 to crack or at least to be permanently stretched so that they do not completely return to the initial relaxed positions). However, for a typical pair of field glasses 52, the approximately 10 o'clock and 2 o'clock locations described above should prove appropriate. If needed, appropriate spacers (not illustrated) are provided so as to provide a snug fit of the binoculars 52 within the two holder 12 and 14 so that the ocular lenses 58 are positioned as close as possible to the open tops 22 and 40.

The user can now use the binoculars 52 by first removing the first cap 26 and the second cap 44 from their respective holders 12 and 14 and grasp the device 10 via the first neck portion 20 and the second neck portion 38 in much the same way that the binoculars 52 are grasped. The user looks through the first open top 22 and the second open top 40 in order to look through the ocular lenses 58 of the binoculars 52. The first open bottom 18 and the second open bottom 36 are each sufficiently large so that the objective lenses 56 of the binoculars 52 can "see" out of the holder 10 without obstruction from the holder 10. The eye pieces 60 of the binoculars 52 are located sufficiently close to the open tops 22 and 40 of the respective holders 12 and 14 so that undue unwanted light does not enter the user's field of vision, however, if desired, the first holder 12 and the second holder 14 can be in a shaded color (as opposed to clear) in order to minimize such light. When use of the binoculars 52 is not desired, the caps 26 and 44 can be reattached to their respective holders 12 and 14. If desired, a lanyard (not illustrated) can be attached to the holder for field glasses 10 in order to help the user carry the device 10, or the user can use the lanyard (also not illustrated) of the binoculars 52.

In order to remove the binoculars 52 from the device 10, the first holder 12 and the second holder 14 are each gapped at their respective slits 30 and 48 and the binoculars 52 are removed by backing them out in reverse direction relative to the direction the binoculars 52 were inserted. Once the binoculars 52 are clear of the device 10, the first holder 12 and the second holder 14 once again resilient return back to their relaxed positions.

Alternately, the binoculars can be an integral party of the two receptacles such that two ocular lenses are located at the two open tops respectively of the neck while the two objective lenses are located at the two open bottoms respectively. The bridge is integrally attached to the two receptacles and there is no need for the slits or the slots. Such binoculars function in the usual way.

While the invention has been particularly shown and described with reference to embodiments thereof, it will be appreciated by those skilled in the art that various changes in form and detail may be made without departing from the spirit and scope of the invention.

I claim:

1. A holder comprising:
   a resilient first receptacle having a first body portion and a first neck portion extending upwardly from the first body portion, the first body portion having an open first bottom and the first neck portion having an open first top wherein a first slot is located within the first neck portion and a first slit extends between the first bottom and the first slot; and
   a resilient second receptacle having a second body portion and a second neck portion extending upwardly from the second body portion, the second body portion having an open second bottom and the second neck portion having an open second top wherein a second slot is located within the second neck portion and a second slit extends between the second bottom and the second slot and wherein the second body portion of the second receptacle is attached to the first body portion of the first receptacle such that the first receptacle and the second receptacle are parallel to each other and such that the second slit faces the first body portion and the first slit faces the second body portion.

2. The holder as in claim 1 wherein a first outer surface of the first neck portion has first threading thereon proximate the first open top and a second outer surface of the second neck portion has second threading thereon proximate the second open top.

3. The holder as in claim 2 further comprising:
   a first cap removably and threadably attached to the first threading; and
   a second cap removably and threadably attached to the second threading.

4. The holder as in claim 3 wherein the first cap is connected to the first receptacle by a first tether and the second cap is connected to the second receptacle by a second tether.

5. The holder as in claim 1 in combination with a pair of binoculars, the binoculars having a first body member with a first objective lens and a first ocular lens and a second body member with a second objective lens and a second ocular lens with the first body member and the second body member connected to each other by a bridge, and wherein the binoculars are removably receivable with the first receptacle and the second receptacle by gapping the first slit and gapping the second slit and inserting the binoculars into the first receptacle and the second receptacle, first ocular lens side and second ocular lens side first, and passing the bridge through the gapped first slit and the gapped second slit until the bridge is received within the first slot and the second slot wherein the first slit resiliently degaps and the second slit resiliently degaps.

6. The holder as in claim 5 wherein a first outer surface of the first neck portion has first threading thereon proximate the first open top and a second outer surface of the second neck portion has second threading thereon proximate the second open top.

7. The holder as in claim 6 further comprising:
   a first cap removably and threadably attached to the first heading; and
   a second cap removably and threadably attached to the second threading.

8. The holder as in claim 7 wherein the first cap is connected to the first receptacle by a first tether and the second cap is connected to the second receptacle by a second tether.

9. A holder comprising:
   a first plastic drink bottle having a first body portion that has a first closed bottom that is cutaway from the first body portion, the first plastic drink bottle also having a first narrower neck portion that has a threaded open first top, a first slot is made within the first neck portion and a first slit is made between the first bottom and the first slot; and
   a second plastic drink bottle having a second body portion that has a second closed bottom that is cutaway from the second body portion, the second plastic drink bottle also having a second narrower neck portion that has a threaded open second top, a second slot is made within the second neck portion and a second slit is made between the second bottom and the second slot and wherein the second body portion of the second bottle is attached to the first body portion of the first bottle such that the first bottle and the second bottle are parallel to each other and such that the second slit faces the first body portion and the first slit faces the second body portion.

10. The holder as in claim 9 further comprising:
    a first cap removably and threadably attached to the first neck portion; and
    a second cap removably and threadably attached to the second neck portion.

11. The holder as in claim 10 wherein the first cap is connected to the first receptacle by a first tether and the second cap is connected to the second receptacle by a second tether.

12. The holder as in claim 9 in combination with a pair of binoculars, the binoculars having a first body member with a first objective lens and a first ocular lens and a second body member with a second objective lens and a second ocular lens with the first body member and the second body member connected to each other by a bridge, and wherein the binoculars are removably receivable with the first bottle and the second bottle by gapping the first slit and gapping the second slit and inserting the binoculars into the first bottle and the second bottle, first ocular lens and second ocular lens side first and passing the bridge through the gapped first slit and the gapped second slit until the bridge is received within the first slot and the second slot wherein the first slit resiliently degaps and the second slit resiliently degaps.

13. The holder as in claim 12 further comprising:
    a first cap removably and threadably attached to the first neck portion; and
    a second cap removably and threadably attached to the second neck portion.

14. The holder as in claim 13 wherein the first cap is connected to the first receptacle by a first tether and the second cap is connected to the second receptacle by a second tether.

* * * * *